E. W. HULET & W. S. EATON.
AUTOMOBILE VENTILATOR.
APPLICATION FILED FEB. 2, 1912.

1,113,349.  Patented Oct. 13, 1914.

WITNESSES:
E. B. Gilchrist
H. R. Sullivan

INVENTORS:
Ernest W. Hulet
William S. Eaton
by their attorneys,
Thurston & Kwis

UNITED STATES PATENT OFFICE.

ERNEST W. HULET AND WILLIAM S. EATON, OF CLEVELAND, OHIO, ASSIGNORS TO THE WHITE COMPANY, OF CLEVELAND, OHIO, A CORPORATION OF OHIO.

AUTOMOBILE-VENTILATOR.

1,113,349.

Specification of Letters Patent. Patented Oct. 13, 1914.

Application filed February 2, 1912. Serial No. 674,938.

*To all whom it may concern:*

Be it known that we, ERNEST W. HULET and WILLIAM S. EATON, citizens of the United States, and residents of Cleveland, in the county of Cuyahoga and State of Ohio, have invented a certain new and useful Improvement in Automobile-Ventilators, of which the following is a full, clear, and exact description.

This invention relates to an automobile ventilator, that is to say, to a device designed with special reference to ventilating the fore passenger-compartment of an automobile carriage or that compartment adjacent to the engine and much affected by the heat therefrom, and particularly in auto-carriages which are equipped with front wind-shields and have fore-doors which close in the compartment on both sides and render such incidental ventilation as it may get from above both uncertain and ineffectual.

The objects of the invention are to provide means for the admission of air into the front of the fore compartment, at a low plane, over the top of the dash and below the wind-shield, if a wind-shield is employed; to provide support for the wind-shield; to prevent the free admission of dirt, rain or snow with the air; to deflect the incoming air downwardly into the lower depths of the compartment; to control the width of the ventilator opening and such other objects as may hereinafter appear.

Figure 1:
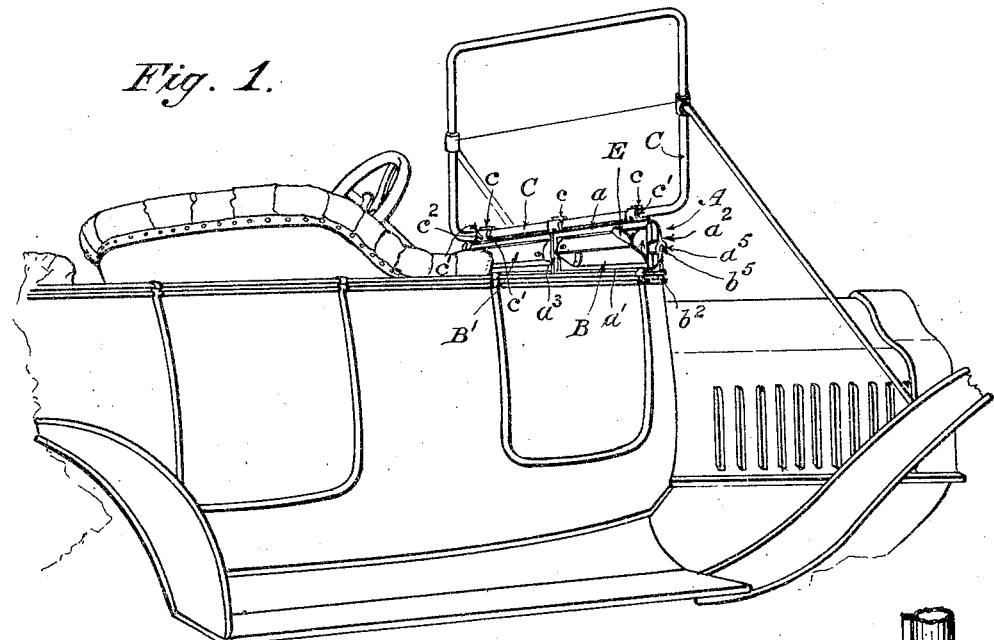
Figure 2:
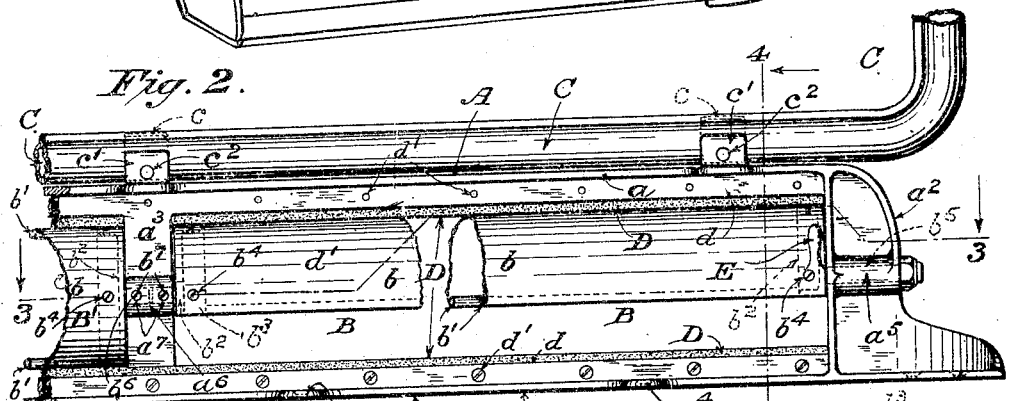
Figure 3:
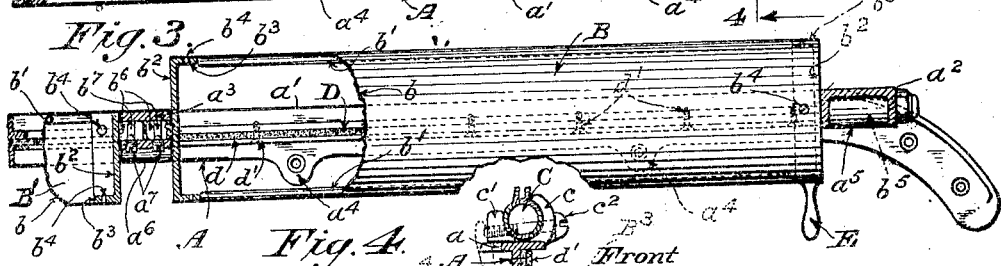
Figure 4:
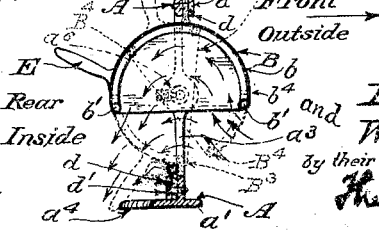

The invention consists of a device adapted to carry out the above stated objects, and that embodiment of it which, at present, is considered most desirable is shown in the accompanying drawing in which:

Figure 1 is a perspective view of a portion of an automobile tonneau or body provided with rear and fore doors to close the sides of the respective compartments and further provided with a wind-shield which is supported upon the frame of the ventilating device, which, in turn, is mounted upon and secured to the dash in front of the fore compartment. Fig. 2 is a rear elevation, on enlarged scale, of the right hand end or half of the ventilating device, some of the parts being broken away for the purpose of clearer illustration; the semi-cylindrical shutter or gate at the right end being shown in about half throw, its widest open position, while the short fragmentary end of the left hand shutter is shown tightly closed. Fig. 3 is a plan or top view of the same partly in section on the line 3, 3 of Fig. 2. Fig. 4 is a vertical transverse section of the same on the line 4, 4 of Fig. 2.

The principal features of the invention are a vertical frame A which extends across the front of the fore compartment and has in it a longitudinal opening in which is rotatably mounted a semi-cylindrical shutter or gate B. The frame consists of upper and lower longitudinal bars, $a$, $a'$, connected at their ends by vertical brackets $a^2$ and preferably at mid-length by a vertical bar $a^3$, this latter dividing the frame opening into two parts. The flanged base of the lower bar $a'$ may be formed at suitable intervals with lugs $a^4$ to receive the screws or other means for securing it on the top edge of the dash, and the flanged bases of the end brackets $a^2$ are suitably curved or otherwise shaped to fit upon and be secured to the ends of the dash.

Upon the flanged top of the upper frame bar $a$ are formed the rigid members $c$ of clamps adapted to engage and hold the lower member C of the frame of a wind shield, these members of the clamps as well as their movable companion members $c'$ being, in this instance, concavely grooved on their adjacent faces to adapt them for engagement with the, preferably, cylindrical frame bar of the shield. Screws $c^2$ passing loosely through the fixed members $c$ and tapped into the movable members $c'$ draw these clamp members together.

Each of the shutter gates B and B' is composed of a sheet metal body $b$ bent in open U shape or trough form slightly exceeding semi-cylindrical, and of a size to fill an opening in the ventilator frame. The edges of this open trough are strengthened by beads $b'$ and the ends are closed by heads $b^2$ having flanges $b^3$ to which the shell is secured by screws $b^4$ or other suitable means. On the outer face of each head is a trunnion adapted to engage one of the bearing bosses $a^5$ or $a^6$ in the ventilator frame. The trunnion $b^5$ extends entirely through the end bearing $a^5$ and has a nut screwed firmly upon its projecting end while the trunnion $b^6$ extends about half way through the central bearing $a^6$ and is grooved as at $b^7$ for the reception of the end of a screw $a^7$ in the bearing which prevents the accidental withdrawal of the trunnion. The heads have one straight edge extending across from edge to edge of the shell as shown in the drawing.

The shutter gates might be made to snugly fit the frame openings, metal to metal, and under proper conditions this might be satisfactory, but it is desirable to make the shutters of thin, light sheet metal that is easily indented and not entirely dependable for holding its shape. It is therefore deemed best to make the frame openings quite a bit wider than the diameter of the shutters and to span the space thus left at each side of the shutter with a flexible material. To this end strips D of woolen cloth or other suitable material are placed along the top and bottom sides of the frame openings, projecting into them sufficiently to meet the outer sides of the rotatable shutters and held in place against the web of the frame by metal strips $d$ and clamping screws $d'$. Each shutter is provided with a handle E located, preferably, on the inner or rear side and near its outer end so as to be easily accessible to the user.

When closed the shutters stand with their concave sides to the front as shown by the fragments of the left hand shutters in Figs. 2 and 3 and by the dotted-line position $B^3$ in Fig. 4. Their widest open position is shown by the left hand shutter of Fig. 1, the right hand shutters of Figs. 2 and 3, and the full line position of Fig. 4. In this last mentioned figure the flying arrows, on the full-line position of the shutter, indicate the deflecting function of the concave inner surface of the shutter which, in this position, deflects the stream of air down toward the bottom of the compartment where it is most needed to offset the disagreeable effects from the heated parts of the engine just below the feet of the passenger. As the shutter is rolled on its axis the angle of this deflection changes, so that when it is set in the dotted-line position $B^4$, Fig. 4, the stream of air flows more directly back than down.

In some cases it might be desirable to have a single opening extending entirely across the ventilator frame and closed by a single shutter, but for practical use it is considered preferable to have the two independently operable shutters, because short shutters are proportionately stiffer and stronger, and further, with two shutters, the ventilation of each side of the compartment can be regulated independently.

The prevailing practice of clamping the wind shield directly upon the upper edge of the dash prevents the admission at this point of any regulatable ventilation, but with this invention this established usage is departed from in mounting the ventilator frame instead of the wind shield upon the dash or other suitable support and providing it with means for supporting the wind shield.

While wind shields are specifically mentioned herein it is not intended to limit the invention to use in combination with wind shields only, but to use it with any form of shields, hoods or covers that inclose the front compartment against proper ventilation.

Having thus described the invention, what is claimed as new and useful is:

1. In a ventilator, the combination of a rectangular frame bounding a narrow elongated horizontal opening, with a trough shaped sheet metal shutter fitted in said opening and connected by horizontal alined pivots to the end members of said frame.

2. In a ventilator, a rectangular frame bounding a narrow elongated horizontal opening, and provided along its lower edge with means for attaching said frame to a support, with a trough shaped sheet metal shutter fitted in said opening and connected by horizontal alined pivots to the end members of said frame.

3. In a ventilator, the combination of a rectangular frame comprising a top member, bottom member, two end members, and a vertical member extending from the bottom member to the top member about midway between the two end members, means on the lower member of said frame for connecting the same to a support, with two trough shaped sheet metal shutters fitted into the narrow elongated openings through the frame on each side of the central vertical member, and connected to said frame on horizontal alined pivots.

4. In a ventilator, the combination of a rectangular frame bounding a narrow elongated horizontal opening, with a trough shaped sheet metal shutter fitted in said opening and connected by horizontal alined pivots to the end members of said frame, and an operating handle secured to said shutter for turning the same and for limiting the extent to which said shutter can be turned by engaging with the upper and lower frame members.

5. In a ventilator, the combination of a rectangular frame bounding a narrow elongated horizontal opening, the lower frame member being provided with means for attaching said frame to a support, and the upper frame member being provided with clamps adapted to engage with the lower member of a wind shield, and a trough shaped sheet metal shutter fitted in said opening and connected with said frame by horizontal alined pivots.

In testimony whereof, we hereunto affix our signatures in the presence of two witnesses.

ERNEST W. HULET.
WILLIAM S. EATON.

Witnesses:
  WM. WAYNE CHASE,
  E. L. THURSTON.